A. D. MOWERS.
DIRIGIBLE AUTOMOBILE LAMP.
APPLICATION FILED AUG. 16, 1915.
1,163,027.
Patented Dec. 7, 1915.
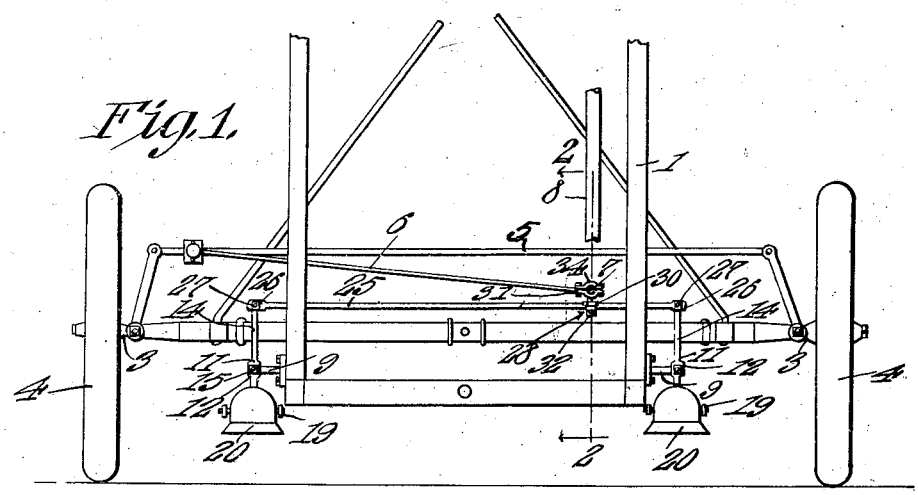
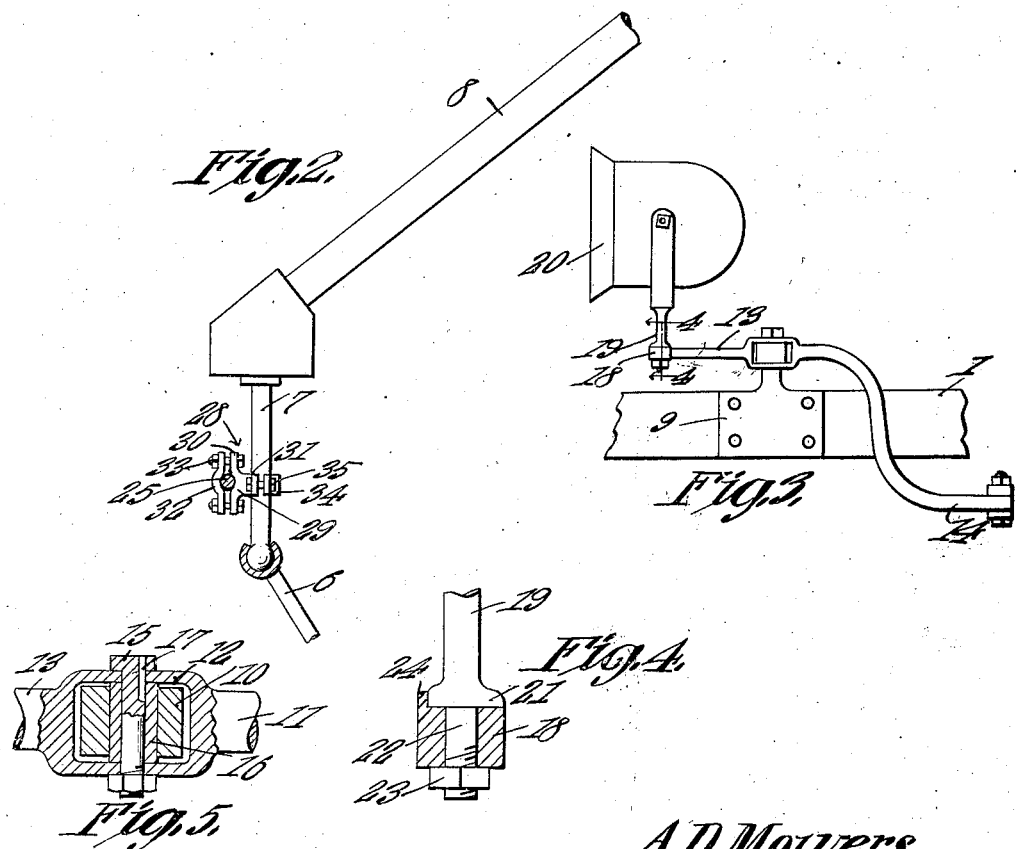
Witnesses
A. D. Mowers,
Inventor
by
Attorneys

UNITED STATES PATENT OFFICE.

ARTHUR D. MOWERS, OF FILLMORE, NORTH DAKOTA.

DIRIGIBLE AUTOMOBILE-LAMP.

1,163,027.  Specification of Letters Patent.  Patented Dec. 7, 1915.

Application filed August 16, 1915. Serial No. 45,796.

*To all whom it may concern:*

Be it known that I, ARTHUR D. MOWERS, a citizen of the United States, residing at Fillmore, in the county of Benson and State of North Dakota, have invented a new and useful Dirigible Automobile-Lamp, of which the following is a specification.

The present invention appertains to dirigible automobile lamps, and aims to provide a novel and improved means adapted especially for use on Ford automobiles although adapted for use on other motor vehicles as well, whereby the lamps or headlights will be turned to one side or the other when the steering wheels are angled for steering the vehicle, so that the light will be properly directed in advance of the vehicle while the same is traveling in a straight or curved line.

It is the object of the invention to provide a dirigible lamp attachment for Ford and other automobiles, which attachment possesses novel and improved features of construction to enhance the utility and efficiency thereof, the device being simple and inexpensive in construction.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a fragmental plan view of a chassis of a Ford automobile illustrating the attachment applied thereto. Fig. 2 is an enlarged sectional view taken on the line 2—2 of Fig. 1, portions being illustrated in elevation. Fig. 3 is an enlarged side elevation of one of the levers carrying the respective lamp or headlight. Fig. 4 is an enlarged sectional detail taken on the line 4—4 of Fig. 3. Fig. 5 is an enlarged sectional detail of the pivotal connection between one of the levers and the respective bracket.

In the drawing, there is depicted a portion of the chassis of a Ford automobile to which the attachment is applied, although it is to be understood that the attachment can be applied to various other motor vehicles, appropriate changes being made if necessary. The chassis illustrated embodies a frame 1, front axle 2 to the ends of which the knuckles 3 are pivoted, said knuckles having the front wheels 4 journaled thereon. The knuckles 3 are connected by a transverse steering rod 5 causing the knuckles to swing simultaneously, and the rod 5 is connected by means of a link or rod 6 with the free end of a depending arm 7 arranged to be oscillated transversely by means of the steering post 8. Attached to the sides of the frame 1 adjacent the forward end thereof is a pair of outstanding brackets 9 having the eyes 10 at their free ends, to which eyes the lamp brackets are ordinarily attached. The foregoing parts are common on Ford automobiles, and no further detailed description or illustration thereof is thought necessary.

In carrying out the present invention, a pair of levers 11 are applied to the brackets 9, each of said levers being provided between its ends with a yoke 12 for receiving the respective eye 10, the lever having a short forwardly projecting arm 13, and a relatively long and rearwardly projecting arm 14 which has its free end offset downwardly in a horizontal plane below the frame 1.

In pivoting or fulcruming the levers 11 to the brackets 9, the yokes 12 are slipped over the eyes 10, and bolts or other pivotal elements 15 are engaged downwardly through the yokes 12 and eyes 10. A bushing 16 is fitted upon each bolt 15 within the respective yoke 12 and fits snugly within the respective eye 10, to provide a suitable bearing for the lever. The bolts 15 are preferably provided with oil ducts 17 extending downwardly from their upper ends, to enable oil or other lubricant to be injected for lubricating the bearing between the bolts or pivot elements 15 and the bushings 16.

The lamps or headlights are carried by the forwardly projecting short arms 13 of the levers 11, the free ends of said arms 13 having eyes 18 whose axes are vertical. The lamp brackets 19 to which the lamps or headlights 20 are attached, are provided with flanges or bases 21 at their lower ends seating upon the eyes 18 and provided with depending stems 22 extending through said eyes, and nuts 23 are threaded upon the stems 22 for clamping the brackets 19 in place. The eyes 18 have upstanding lips 24 fitting the flattened sides of the flanges 21, for preventing the rotation of the brackets 19 with respect to the levers 11. When the levers 11 are in longitudinal position, the lamps 20 are directed straight ahead.

As a means for swinging the levers 11 simultaneously, and to operatively connect said levers with the steering gear of the vehicle, a transverse rod or link 25 disposed below the frame 1 is provided with terminal forks 26 straddling the free ends of the rear arms 14 and pivotally attached thereto by means of bolts or other pivot elements 27. The link 25 is reciprocated so as to oscillate the levers 11. This rod or link 25 is operatively connected with the steering gear, and to this end the arm 7 of the steering gear is employed, since said arm has very little vertical movement with respect to the frame, and this will render unnecessary, the employment of means in the attachment for accommodating the vertical motion of the lower portion of the steering gear with respect to the frame. An attaching or coupling device 28 is employed for connecting the link 25 and arm 7, said device 28 embodying an intermediate block or member 29 disposed between the link 25 and arm 7 and having a vertical clamp element 30 at its forward end and a horizontal clamp element 31 at its rear end, the former being adapted to engage the link or rod 25 and the latter being adapted to engage the arm 7. The vertical clamp element 32 coöperates with the clamp element 30, said clamp elements being connected by bolts or other clamping elements 33 whereby the clamp elements 30 and 32 tightly embrace the link 25, to prevent the block 29 from being shifted longitudinally relative to the link 25, although if the bolts 33 are loosened, the block 29 may be adjusted longitudinally of the link 25 to the desired position. A horizontal clamp element 34 coöperates with the clamp element 31, the two being clamped together by bolts or other clamping members 35, and the clamp elements 31 and 34 loosely surround the arm 7. The device 28 is thus provided with a clamp at its forward end for clamping the link 25, and is provided in rear of said clamp with means for loosely surrounding the arm 7, whereby when the arm 7 is oscillated laterally, the block 29 will be moved laterally for reciprocating the link 25.

The attachment may be readily applied to the chassis. When the attachment is properly applied, the arm 7 being moved to one side for steering the vehicle to one side, will also move the link 25 whereby the levers 11 are swung. The lamps 20 are thus turned to the respective side for directing the light in the direction that the vehicle is turning. When the arm 7 is moved in the other direction, the lamps are swung in the opposite direction so that it will be seen that the lamps are continually directed in a desirable manner ahead of the vehicle. Consequently, the road or thoroughfare will be properly illuminated in advance of the vehicle whether the vehicle be traveling on a straight or tortuous road, and when the vehicle turns a corner, the light will be thrown to the proper side for the convenience of the operator. The turning of the lamps or headlights is also of advantage for other obvious reasons.

What is claimed is:

1. The combination with the frame of a motor vehicle and a transversely swinging depending arm of the steering gear, of a pair of levers pivoted to the frame, lamps carried by the levers, a link connecting the levers, and a member having a clamp embracing said link and provided with a portion loosely surrounding said arm.

2. The combination with the frame and steering gear of a motor vehicle, outstanding brackets carried by the sides of the frame, levers fulcrumed to said brackets between their ends, the levers having forwardly projecting arms and rearwardly projecting downwardly offset arms, a link connecting the last mentioned arms, lamp brackets carried by the first mentioned arms, and an operative connection between the said link and the steering gear In testimony that I claim the foregoing as my own, I have hereto affixed my signature in the presence of two witnesses.

ARTHUR D. MOWERS.

Witnesses:
A. J. SCOBBA,
S. B. BREVIG.

Copies of this patent may be obtained for five cents each, by addressing the "Commissioner of Patents. Washington, D. C."